United States Patent [19]

Shida et al.

[11] Patent Number: 5,361,119
[45] Date of Patent: Nov. 1, 1994

[54] FOCUS STATE DISPLAY DEVICE FOR CAMERA

[75] Inventors: Masaru Shida, Yokohama; Akira Ezawa, Tokyo; Tsutomu Wakabayashi, Yokohama; Kimio Uematsu, Tokyo; Keiji Ohsawa, Yokohama; Shinichi Tsukada, Toride; Toshihiro Sato, Yokohama, all of Japan

[73] Assignee: Nikon Corporation, Tokyo, Japan

[21] Appl. No.: 145,312

[22] Filed: Nov. 3, 1993

Related U.S. Application Data

[63] Continuation of Ser. No. 813,927, Dec. 27, 1991, abandoned.

[30] Foreign Application Priority Data

Jan. 8, 1991 [JP] Japan .................................... 3-18217
Mar. 20, 1991 [JP] Japan .................................... 3-24852

[51] Int. Cl.⁵ .......................................... G03B 13/18
[52] U.S. Cl. ................................................ 354/409
[58] Field of Search ........................................ 354/409

[56] References Cited

U.S. PATENT DOCUMENTS

4,529,286 7/1985 Fujii ............................... 354/409 X
4,994,843 2/1991 Kitazawa ........................... 354/409

FOREIGN PATENT DOCUMENTS

56-99332 8/1981 Japan.
1-288845 11/1989 Japan.

Primary Examiner—William B. Perkey
Attorney, Agent, or Firm—Shapiro and Shapiro

[57] ABSTRACT

There is disclosed a focus state display device, adapted for use in a camera which has plural focus detection areas in the phototaking image field and effects focusing in one area (focusing area) selected from such plural focus detection areas. The device has a display with two different display modes, and displays the focusing area in one display mode when the lens of the camera is in an infocus state to the object in the focusing area, and in the other display mode when the lens is in an out-of-focus state to the object in the focusing area. In another embodiment, the device has a display with three different display modes, and displays the focusing area by a display mode and other focus detection areas (namely nonfocusing areas) by two other display modes depending on whether the object in respective area is in focus or out of focus.

4 Claims, 10 Drawing Sheets

FOCUS STATE DISPLAY DEVICE FOR CAMERA

This is a continuation of application Ser. No. 813,927 filed Dec. 27, 1991, now abandoned.

BACKGROUND OF THE INVENTION

1. Field of the Invention

The present invention relates to a focus state display device for use in a camera which is adapted to effect focusing to an object in one of plural focus detection areas within the phototaking image field of said camera.

2. Related Background Art

In the field of conventional cameras, there are already known devices for displaying an area in which the focus detection is to be conducted or a focus state.

Figure 1:
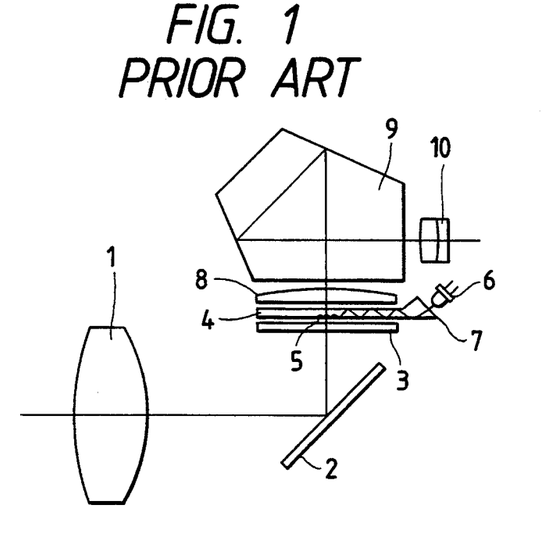
FIG. 1 is a cross-sectional view of a conventional focus state display device for use in a camera.
Figure 2:
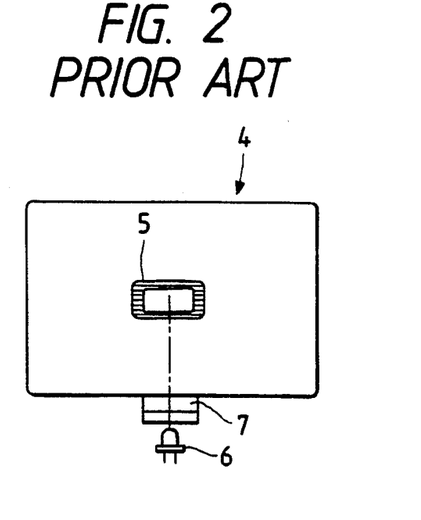
FIG. 2 is a plan view of the conventional device shown in FIG. 1.

FIGS. 1 and 2 are respectively a cross-sectional view and a plan view of a conventional focus state display device, for use in a camera, disclosed in the Japanese Patent Laid-open Application No. 56-99332.

In these drawings there are shown a photo-taking lens 1; a quick-return mirror 2 and a focusing screen 3 provided, for example, with a Fresnel lens thereon. The light entering the phototaking lens 1 is reflected by the mirror 2 and focused on the focusing screen 3.

A focus state display plate 4, composed of a flat transparent substrate, is provided at the central part thereof with a display area 5 consisting of a group of microprisms, as shown in FIG. 2. An illuminating LED 6 is positioned at the side of the display plate 4, and directed toward the display area 5. The light from said illuminating LED 6 enters the display plate 4 through a light-guiding prism 7, then is repeatedly reflected by the upper and lower faces of said display plate 4 and reaches the display area 5, thus illuminating the same.

There are further provided a condenser lens 8, a pentagonal prism 9, and an eyepiece lens 10, through which the image focused on the focusing screen 3 can be observed.

When the illuminating LED 6 is not turned on, the display area 5 appears as a shadow, thus indicating the focus detection area. The LED 6 is turned on when the in-focus state is reached in the course of focus detecting operation, whereby the display area 5 is illuminated in superposition with the image shown in the view finder and can therefore be utilized for the display of focus state. The photographer observes simultaneously the object image in the view finder and the shadow of the display area 5 indicating the focus detection area, and manually focuses the phototaking lens so as that said display area 5 is turned on.

Figure 3:
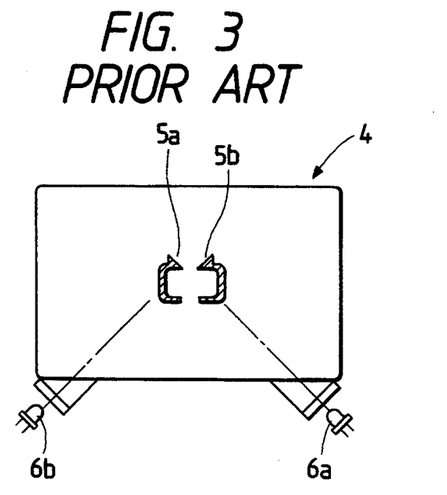
FIG. 3 is a plan view of another conventional focus state display device.

FIG. 3 is a plan view showing another conventional example of the focus state display device, for use in a camera, as disclosed in the Japanese Patent Laid-open Application No. 56-99332. In this example, a display area 5 is divided into partial display areas 5a, 5b arranged in lateral direction and respectively formed in the form of arrows, and a pair of illuminating LED's 6a, 6b are provided respectively corresponding to said partial display areas 5a, 5b. The partial display area 5a at the left is turned on in the so-called rear focused state, while that 5b at the right is turned on in the front focused state, and both areas 5a, 5b are turned on when the photo-taking lens is adjusted to the in-focus state. Consequently the photographer can effect the focusing of the phototaking lens, while continuously watching the image in the view finder.

Figure 4:
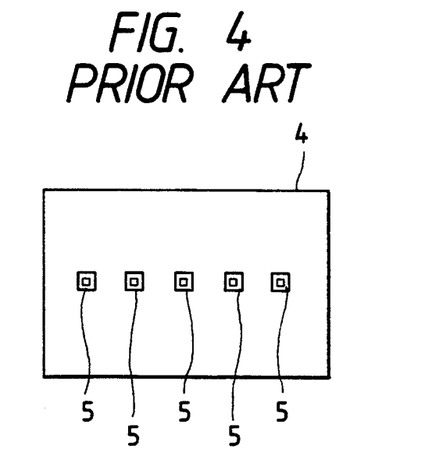
FIG. 4 is a plan view of still another conventional focus state display device.

FIG. 4 is a plan view showing a conventional example of a focus detection area display device, for use in a camera, disclosed in the Japanese Patent Laid-open Application No. 1-288845.

The camera of this conventional example is capable of focus detection in plural areas in the image field. Consequently the display plate 4 is provided with plural display areas 5, and illuminating LED's 6 are provided in a corresponding number. In case of such multi-area focus detection, it is necessary to indicate the area in which the focus detection is to be conducted, and, for this reason, upon selection of a focus detection area, a corresponding display area 5 is turned on.

However, in a camera having plural focus detection areas as shown in FIG. 4, if the display area 5 is turned on for the purpose of indicating the selected focus detection area, said lighted display area 5 can no longer be used for indicating the in-focus or out-of-focus state in the manner as shown in FIGS. 1 and 2.

On the other hand, if the in-focus or out-of-focus state is indicated by the lighting of the display area 5, it is not possible to indicate the focus detection area since no area is lighted in the out-of-focus state. In a camera with plural focus detection areas, if the display of the focus detection area is not available, the photographer is unable to obtain information on said area from the image in the view finder during the focusing operation of the phototaking lens. Consequently the photographer may become uncertain about or forget the selected focus detection area, in case the focusing operation takes a long time for the confirmation of focus state of the background scene or in case the observation of the view finder is interrupted for reconfirming the object.

Such drawbacks can be prevented by dividing, as shown in FIG. 3, each display area 5 into small display areas 5a, 5b and lighting either for indicating the focus detection area. However, such structure will require plural small display areas 5a, 5b and corresponding LED's 6 for each of the plural display areas, thus leading to an increased number of light emitting devices and optical components and eventually to an increased cost and an increased dimension of the camera. Also the distance between the small display areas 5a, 5b along the lateral direction of the display plate 4 becomes smaller than in the conventional device, so that the illumination of a small display area may induce illumination of the neighboring small display areas by stray light.

SUMMARY OF THE INVENTION

A first aspect of the present invention is to provide a display device capable, with a simple structure, of indication of an area used for focus detection and indication of a focus state.

According to the first aspect of the present invention, there is provided a focus state display device, for use in a camera provided with focus detection means for detecting the focus state of plural focus detection areas in the phototaking image field, and selection means for selecting one of said plural focus detection areas as a focusing area, comprising:

display means for displaying the area selected by the selection means in two different display modes; and control means for causing said display means to effect display in one of said display modes when a lens of the camera is in an in-focus state to the object of the selected area, and in the other of said display modes when said lens is in an out-of-focus state.

The display device of the above-mentioned structure is capable, as in the embodiment to be explained later, of indicating an area used for focusing, while distinguishing the in-focus state from the out-of-focus state, for example by continuously lighting the display means in the in-focus state and flashing said display means in the out-of-focus state.

In the device of said first embodiment, the focus state is displayed only in the area used for focusing. Consequently the focus state of the object in other areas cannot be known. The device of a second embodiment of the present invention, for use in a camera provided with focusing means for focusing a phototaking lens to the object in an area, is capable of displaying an area used for focusing and also displaying whether the objects in other areas are contained within the depth of focus.

According to the second aspect of the present invention, there is provided a focus state display device, for use in a camera provided with focus detection means for detecting the focus state in each of plural focus detection areas within a phototaking image field and releasing corresponding focus detection information, and focusing means for selecting one of said plural focus detection areas as the focusing area and focusing a phototaking lens to the object of said focusing area, based on said focus detection information relating to said focusing area, comprising:

display means capable of displaying the focus state of each of said plural focus detection areas in at least three different display modes;

calculation means for calculating information on the depth of focus, based on object distance information on said focusing area and on a selected aperture value of the phototaking lens;

discrimination means for comparing said information on the depth of focus with said focus detection information, thereby discriminating whether the object in at least a non-focusing area, other than said focusing area among said plural focus detection area, is positioned within the depth of focus; and display control means for controlling said display means in such a manner as to display said focusing area, a non-focusing area or areas in which the object is identified to be within the depth of focus, and a non-focusing area or areas in which the object is identified to be outside the depth of focus, in respectively different display modes.

The device of the second embodiment of the present invention displays the focusing area, and, among the non-focusing areas, those identified as within the depth of focus and those identified as outside the depth of focus, in respectively different display modes, so that the photographer can easily recognize whether the objects in the non-focusing areas are contained within the depth of focus. It is therefore rendered possible to maintain the objects of such non-focusing areas within the depth of focus, without unnecessarily reducing the lens aperture based on the experience of the photographer, and therefore to avoid the use of an excessively slow shutter speed.

BRIEF DESCRIPTION OF THE DRAWINGS

FIGS. 5 to 8 illustrate a first embodiment of the device of the present invention, wherein:

FIGS. 9 to 20 illustrate a second embodiment of the present invention, wherein:

DETAILED DESCRIPTION OF THE PREFERRED EMBODIMENTS

Now the present invention will be clarified in detail by a first embodiment thereof.

Figure 5:
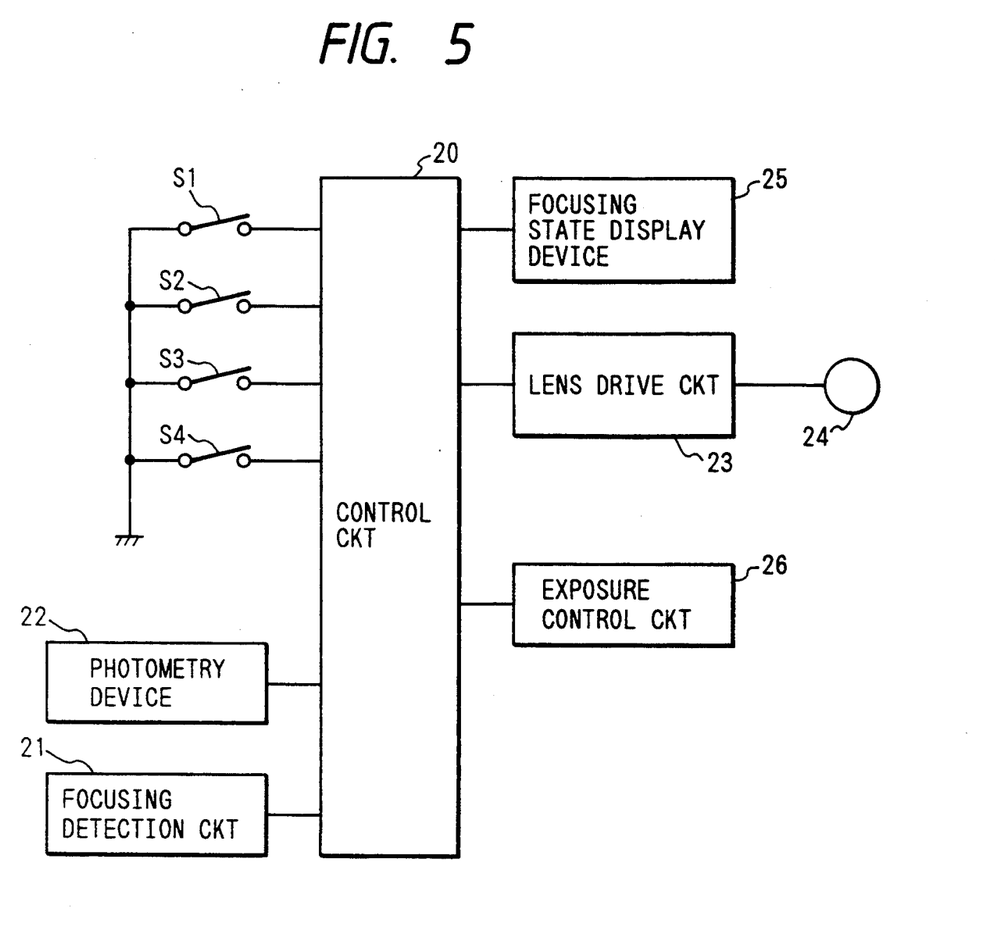
FIG. 5 is a block diagram of the circuit structure of a camera equipped with a focus state display device.

FIG. 5 is a block diagram showing the circuit structure of an embodiment of the camera equipped with a focus state display device.

In FIG. 5 there are shown a control circuit 20 incorporating a microcomputer for controlling the entire camera and other peripheral circuits such as a memory, a discrimination circuit, a calculation circuit, a timer etc.; a focus detection circuit 21 incorporating a photoelectric conversion device etc.; a photometry circuit 22 incorporating a TTL light metering device etc.; a phototaking lens control circuit 23 for controlling a motor 24 for axially driving a phototaking lens; a focus state display device 25; and an exposure control circuit 26 provided with a shutter mechanism and a diaphragm mechanism (not shown).

A half-stroke switch S1 and a full-stroke switch S2, both linked with a shutter release button (now shown) of the camera body, are respectively closed by a first stroke depression and a second stroke depression of said button. Signals indicating the on-off state of said switches S1, S2 are supplied to the control circuit 20.

The focus detection device 21 of the present embodiment can set plural areas in the phototaking image field and effect focus detection for these areas. As already known, the focus detection device 21 is provided with a focus detection optical system for forming an object image on a detection plane which is optically substantially equivalent to the film plane, and a photoelectric converter device for converting the optical image on said detection plane of the focus detection optical system into electrical image signals, and said photoelectric converter device includes photoelectric converter arrays such as CCD in plural pairs, corresponding to plural focus detection areas within the phototaking image field. Said pairs of photoelectric converter arrays are provided with selector switches for selectively sending the signal from one of said pairs to a focus detection circuit in the focus detection device 21. Said selector switch is on-off controlled, for example manually, by an area selector switch S3 provided on the camera body.

The focus state display device 25 of the present embodiment is provided with a display plate positioned above the focusing screen and EC (electro-chromic) devices, provided at the approximate center of said display plate in plural positions corresponding to the focus detection areas of the focus detection device 21 in the phototaking image field.

Also the camera of the present embodiment can select either so-called automatic focusing mode for regulating the phototaking lens by means of the lens control circuit 23 and the motor 24, or manual focusing mode for bringing the phototaking lens to the in-focus position by manual rotation of a focusing ring of the lens. These modes are switched by a mode selector switch S4 provided on the camera body. Also there is provided so-called focusing aid function in which, in the manual focusing mode, the focus state display device 25 displays the in-focus state when the phototaking lens is regulated to said in-focus state. The details of said function will be explained later.

In the following the function of the present embodiment will be explained with reference to FIGS. 6, 7 and 8.

Figure 6:
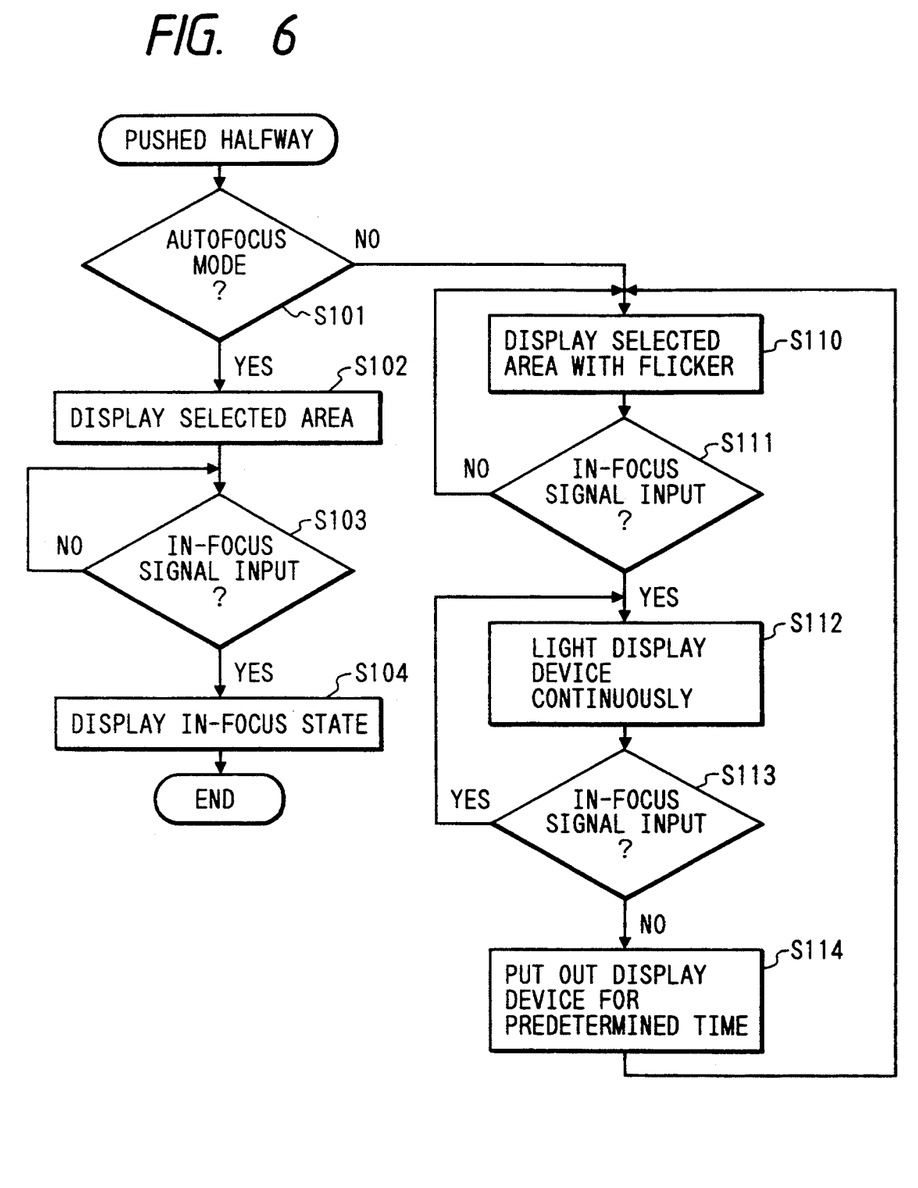
FIG. 6 is a flow chart of the function of said embodiment.

The program shown in the flow chart in FIG. 6 is initiated by the closing of the half-stroke switch S1.

At first a step S101 discriminates the selected focusing mode, and the sequence proceeds to a step S102 in case of the auto focusing mode, or to a step S110 in case of the manual focusing mode.

A step S102 displays a focus detection area selected by the photographer, by turning on the corresponding EC device for several seconds. Then a step S103 awaits an in-focus signal from the focus detection device 21, and the sequence proceeds to a step S104 in response to said signal. The step S104 displays the infocus state by turning on the EC device corresponding to the selected focus detection area for several seconds. These operations are already known in the automatic focusing camera.

Figure 7:
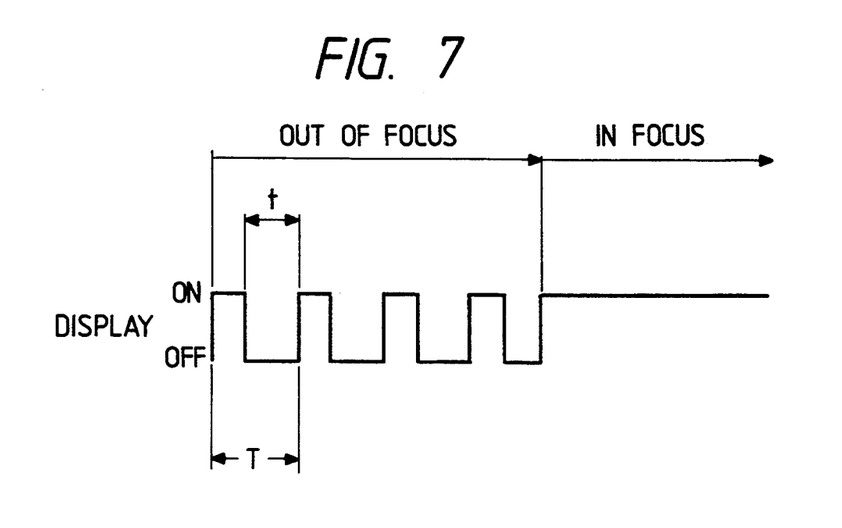
FIG. 7 is a chart showing the function of the focus state display device in shifting from an out-of-focus display to an in-focus display.

On the other hand, the step S110 causes the EC device corresponding to the selected focus detection area to flicker, as shown in FIG. 7, thereby indicating the selected focus detection area and the out-of-focus state. The interval of said flickering need not be as snort as that ordinarily employed in various warnings, but is preferably of a suitable length not hindering the focusing operation by the photographer, for example in a range of ½ to 2 seconds. Then a step S111 discriminates whether an infocus signal has been received from the focus detection device 21, and the sequence proceeds to a step S112 if said signal has been received, or otherwise returns to the step S110. Thus the EC device corresponding to the selected focus detection area continues to flicker until the phototaking lens is adjusted to the in-focus position.

The step S112 displays the in-focus state, as shown in FIG. 7, by shifting the EC device from the flickering state to the continuously lighted state. Then a step S113 discriminates whether an in-focus signal has been received from the focus detection device 21, and the sequence returns to the step S112 if said signal has been received, or otherwise proceeds to a step S114. Thus the EC device corresponding to the selected focus detection area continues to be lighted as long as the phototaking lens is in the in-focus position.

Figure 8:
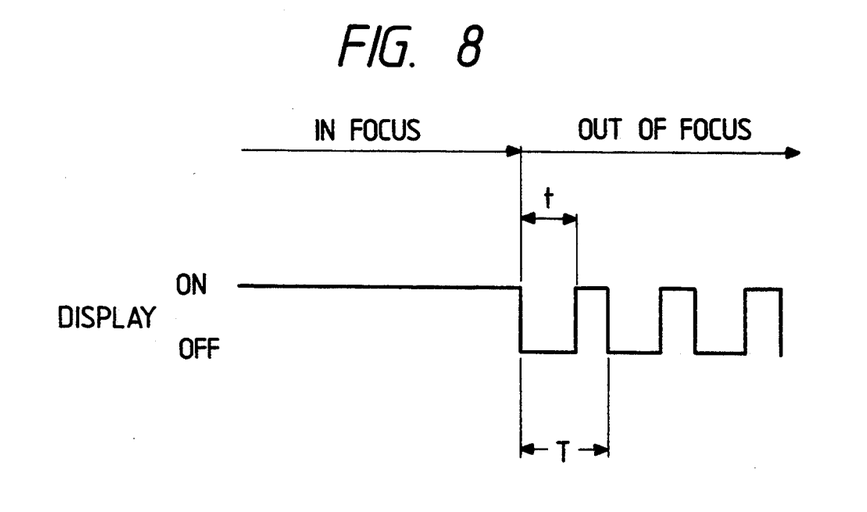
FIG. 8 is a chart showing the function of the focus state display device in shifting from an infocus display to an out-of-focus display.

The step S114 turns off the EC device which has been turned on, as shown in FIG. 8. Thereafter the sequence returns to the step S110, whereupon the EC device starts the flickering again. Thus, if the phototaking lens is shifted from the in-focus state to the out-of-focus state because of a change in the configuration in the image field or a movement of the object, the display of out-of-focus state is given again, starting from a turn-off cycle of the EC device. Consequently the turn-off period t of the EC device in the step S114 is preferably equal to the turn-off time t of the EC device in the flickering in the step S110.

The above-explained sequence is capable of displaying the in-focus and out-of-focus stages. In the present embodiment, an EC device is provided for each focus detection area and is made to flicker for displaying the out-of-focus state or to be continuously turned on to indicate the in-focus state, whereby the selected area can be displayed even during the focus detecting operation. Besides there is required only one display device corresponding to each focus detection area, and there is realized a display device capable of displaying both the selected area and the focus state with a simple structure.

Also in the present embodiment, when the phototaking lens shifts from the in-focus state to the out-of-focus state, the out-of-focus display is initiated from turn-off cycle. Thus the shift to the out-of-focus state is indicated by the turning-off of the display, so that the photographer can immediately know that the phototaking lens has become out of focus.

In the camera equipped with the focus state display device constituting the first embodiment of the present invention, the details thereof are not limited to those explained above but are subject to various modifications. For example, the focus state display device is so constructed as to display the selected area and the focus state in superposition with the image in the view finder, but it may also be provided outside the image field shown in the view finder. Also instead of the optical structure utilizing EC devices in the above-explained embodiment, there may be employed other optical display means or other known display means such as a mechanical display utilizing a pointer. Also the foregoing embodiment employs two display modes of flickering and continuous lighting of the display respectively in the out-of-focus state and in the in-focus state, but the display modes applicable to the present invention are not limited to these modes. For example in case of a structure of illuminating a display area, consisting of microprisms on the display plate by an LED, as in the conventional examples, there may be employed plural LED's to use different illuminating colors for the in-focus and out-of-focus states.

In the following there will be explained a second embodiment of the present invention, with reference to FIGS. 9 to 18.

Figure 9:
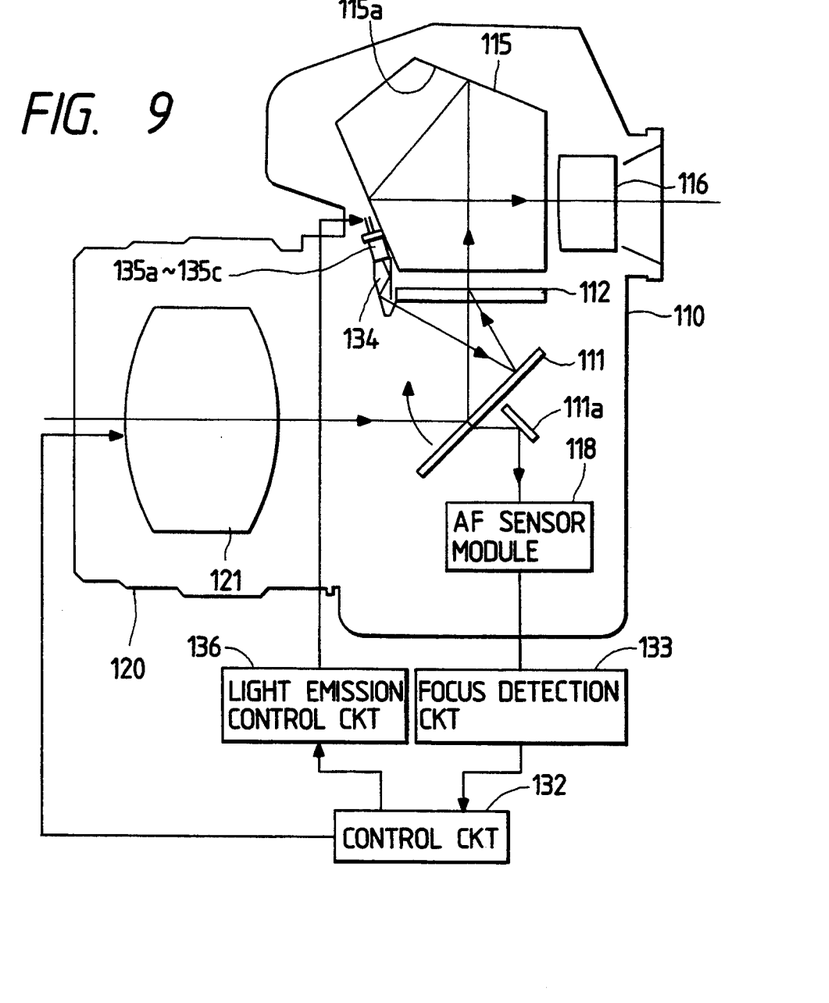
FIG. 9 is a schematic view of a camera equipped with a focus state display device.

FIG. 9 is a schematic view of a camera equipped with a focus state display device of the present invention, wherein shown are a camera body 110, and a phototaking lens barrel 120 mounted on said camera body. When a main mirror (half mirror) 111 in the camera body 110 is in the illustrated lowered position (non-phototaking state), the light coming from the object and transmitted by a phototaking lens 121 in the barrel 120 is partly reflected upwards by said main mirror 111, then transmitted by a focusing screen 112 and a pentagonal prism 115, and is observed through an eyepiece lens 116.

On the other hand, another part of said light, coming through said phototaking lens 121, is transmitted by the main mirror 111, then reflected downwards by a sub mirror 111a and is guided to an AF sensor module 118 positioned at the bottom part of the camera body 110. Said AF sensor module 118 is provided with a photoelectric converter device for receiving the light from the object and photoelectrically converting the same, and sends its photoelectrically converted output (image signal) to a focus detection circuit 133. In response the focus detection circuit 133 effects predetermined focus detecting calculation to determine the defocus amount (including direction of defocus) of the phototaking lens 121, and sends said defocus amount to a control circuit 132. Said defocus amount corresponds to the focus detection information.

Figure 10:
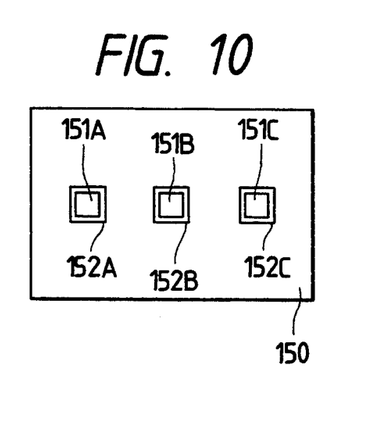
FIG. 10 is a view showing focus detection areas in a phototaking image field and display states thereof.

In the present embodiment, there are provided three sets of said photoelectric converter devices, thereby enabling focus state detection for the objects positioned in three focus detection areas 151A, 151B, 151C on the phototaking image field 150 (observable through the eyepiece lens 116) as shown in FIG. 10. Consequently the focus detection circuit 133 calculates three defocus amounts corresponding to said areas 151A-151C.

Figure 11:
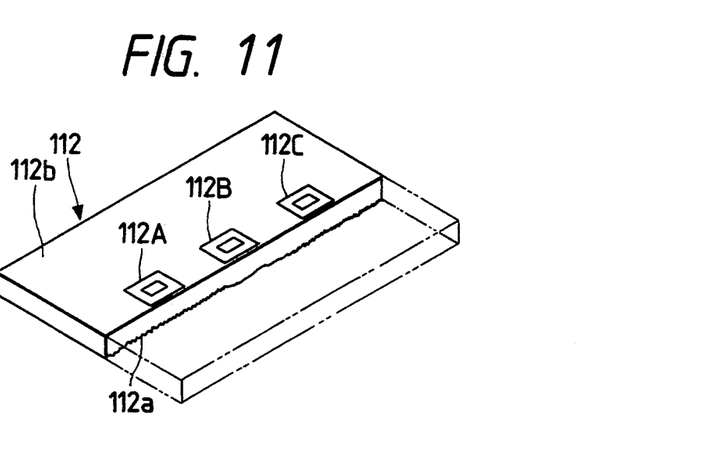
FIG. 11 is a perspective view of a focusing screen and display areas thereof.

The focusing screen 112 is provided, as shown in FIG. 11, with a Fresnel lens 112a on the lower (entrance) face, and a light diffusing surface 112 on the upper (exit) face, on which further formed are three display areas 112A, 112B, 112C each consisting of a plurality of small prisms. Said display areas 112A-112C respectively indicate the positions of the three focus detection areas 151A-151C.

Figure 12:
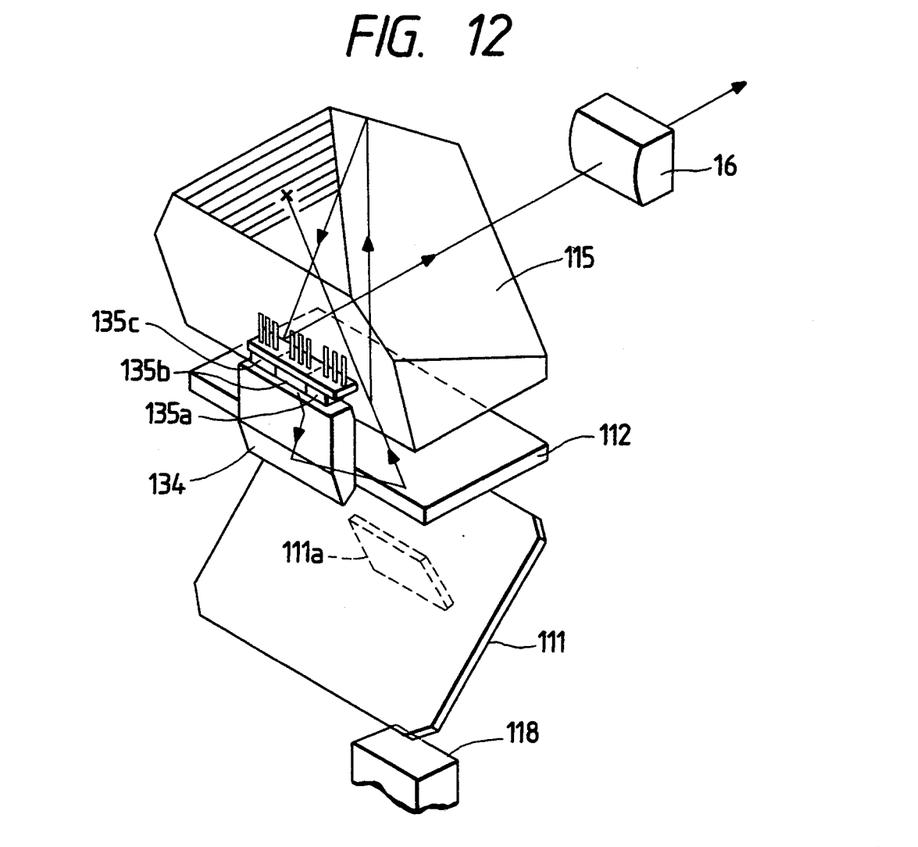
FIG. 12 is a perspective view of a finder optical system.

As shown in FIG. 12, a light-emitting optical element 134 is positioned in front of the focusing screen 112, and is provided thereon with three light-emitting diode (LED) packages 135a, 135b, 135c respectively corresponding to said display areas 112A-112C. Each of said LED packages 135a-135c contains three light-emitting diodes (LED) respectively emitting lights of red, blue and yellow colors and controlled by a light emission control circuit 136. The light from the LED, for example from the LED package 135a is guided, as shown in FIG. 12, through the optical element 134 to the main mirror 111, then enters the entrance face of the focusing screen 112, and enters the pentagonal prism 115 through the Fresnel lens 112a and the display area 112A.

Figure 13:
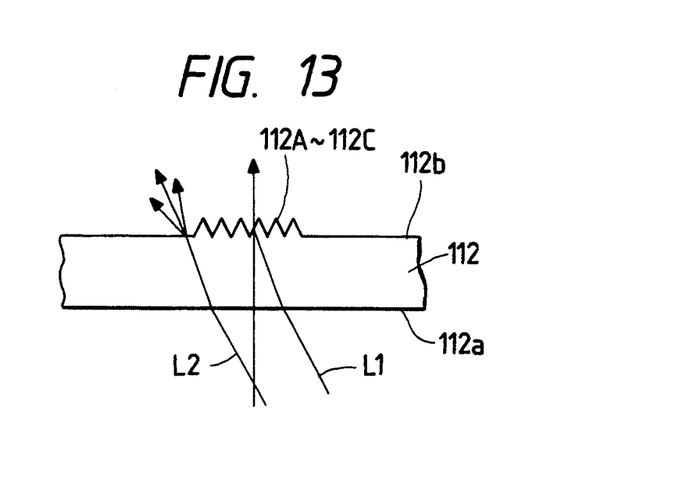
FIG. 13 is a schematic view showing the optical path of the light from the LED, passing through the focusing screen.

Among the light beams from the LED's, as shown in FIG. 13, the one passing through the display area 112A (represented by L1) is refracted by the group of prisms toward a reflecting face 115a of the pentagonal prism 115, while one not passing through the display area 112A is diffused by the diffusing surface 112b and does not reach the reflecting face 115a. Consequently, when an LED is turned on in the package 135a, the image of display area 112A alone is observed through the eyepiece lens 116, together with the object image. Said image of the display are 152A is displayed, as shown by 152A in FIG. 10, so as to surround the focus detection area 151A. Also when an LED in the LED package 135b or 135c is turned on, the image of the display area 112B or 112C is similarly displayed as shown by 152B or 152C. In the present embodiment, since each of the packages 135a-135c contains three light-emitting diodes of red, blue and yellow, display can be obtained in these three colors.

In the following there will be explained the control sequence by the control circuit 132, with reference to flow charts shown in FIGS. 14 to 17.

This sequence is activated in response to a half-stroke depression of an unrepresented shutter release button. At first steps S1 to S3 in FIG. 14 effect focus state detection respectively of the focus detection areas 151A-151C (FIG. 10), by causing the focus detection circuit 133 to calculate the defocus amounts of the phototaking lens 121, based on three output signals (image signals) of the AF sensor module 118, respectively corresponding to the areas 151A-151C.

Figure 14:
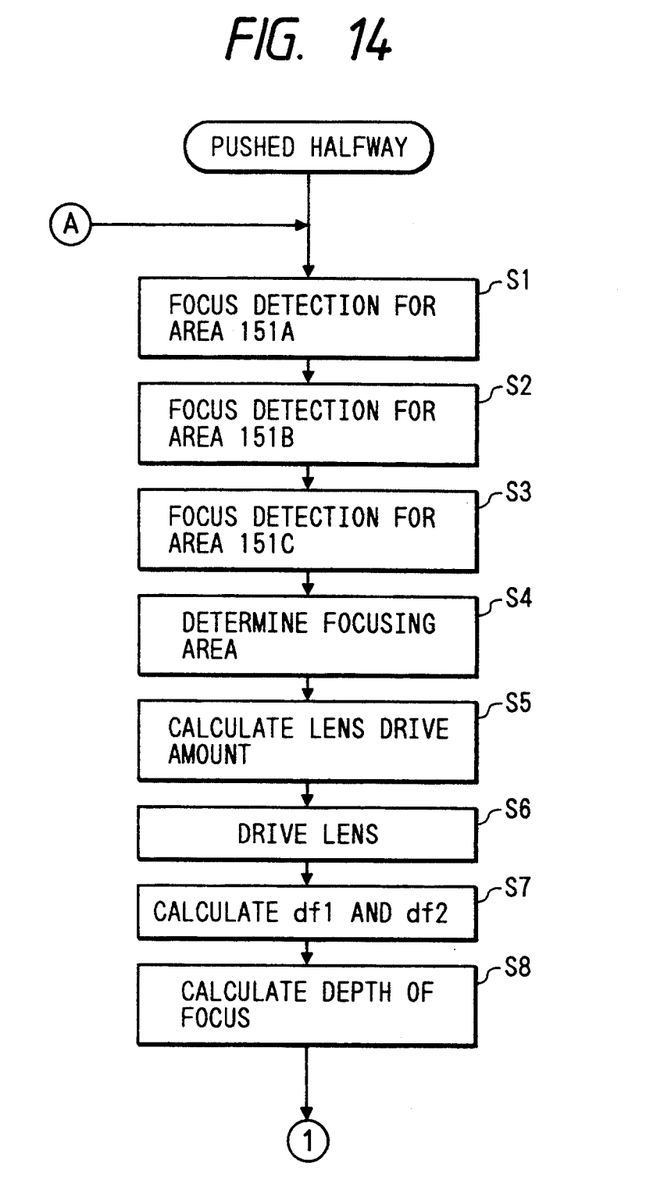
FIG. 14 is a flow chart showing a main display sequence.

A next step S4 determines an area, to the object of which the phototaking lens 121 is to be focused (for example it is to be focused to the object of shortest distance). Said determined area constitutes the focusing area, and other areas constitute the non-focusing areas. A next step S5 calculates the lens drive amount, based on a defocus amount corresponding to said focusing area, among three defocus amounts calculated above, and a step S6 sends a lens drive signal, corresponding to said lens drive amount, to an unrepresented lens drive circuit, thereby driving the phototaking lens 121 to the in-focus position, thus focusing said lens to the object in the focusing area.

Then a step S7 calculates the defocus amounts df1, df2 in the two non-focusing areas when the defocus amount of the focusing area is set at zero, and a step S8 calculates the depth of focus (information relating to the depth of object field), from the selected aperture value and the object distance. Said aperture value is either selected by the photographer (aperture preference mode or manual mode), or calculated from the film speed and the object brightness detected by an unrepresented light metering device in response to the half-stroke depression of the shutter release button (program mode). Also the object distance is detected by an unrepresented distance encoder, after the lens drive mentioned above.

Figure 15:
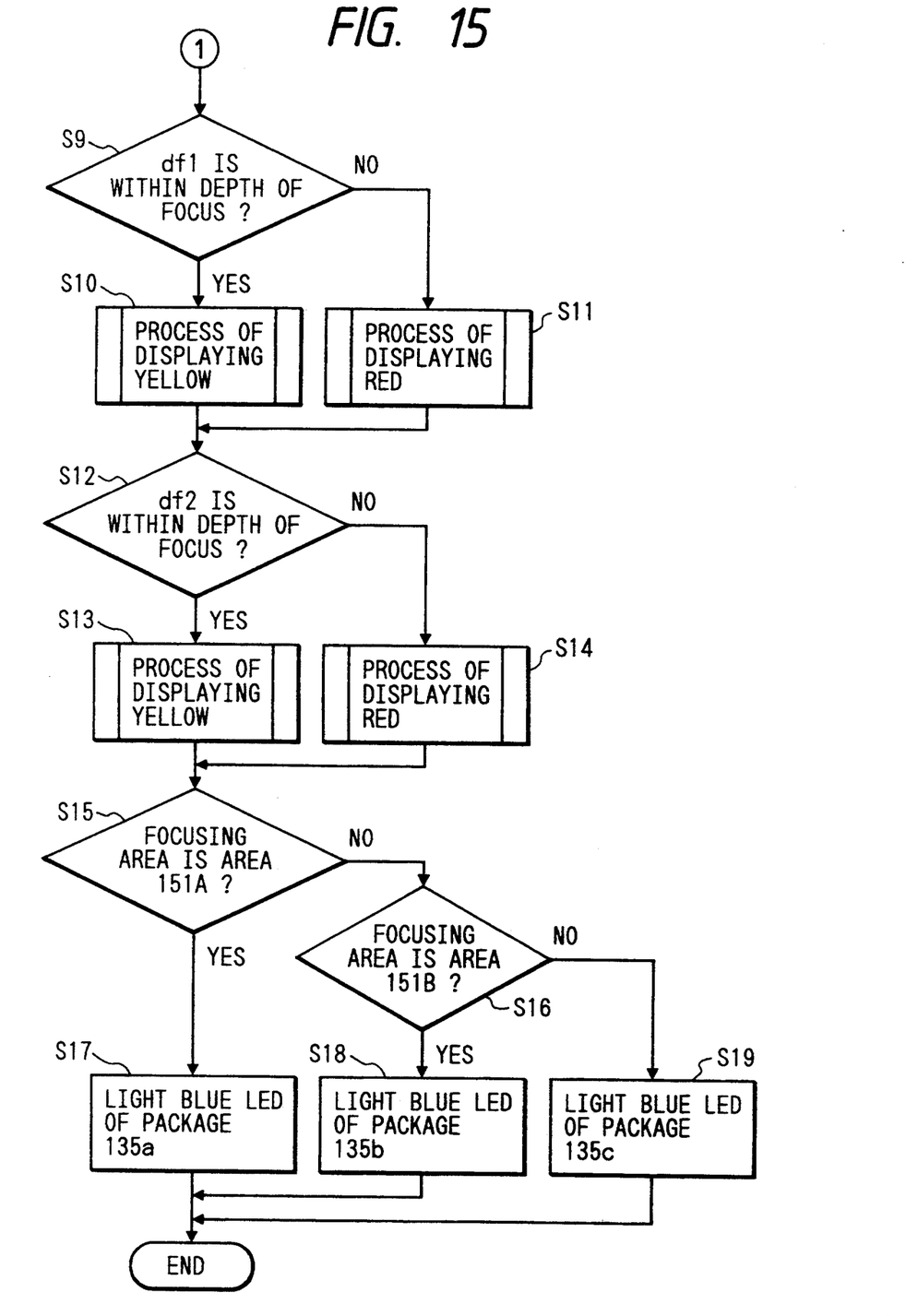
FIG. 15 is a flow chart showing a sequence succeeding to that shown in FIG. 14.

Then the sequence proceeds to a step S9 in FIG. 15, for discriminating whether the defocus amount df1 of one of the non-focusing areas is within thus calculated depth of focus. If said discrimination turns out affirmative, the sequence proceeds to a step S10 for yellow color display, but, if negative, the sequence proceeds to a step S11 for red color display. The defocus amount df1 of said non-focusing area contained within the depth of focus means that the object positioned in said area is within the depth of object field in the focused state of said phototaking lens 121, and said defocus amount outside the depth of focus means that the object positioned in said area is outside said depth of object field.

Figure 16:
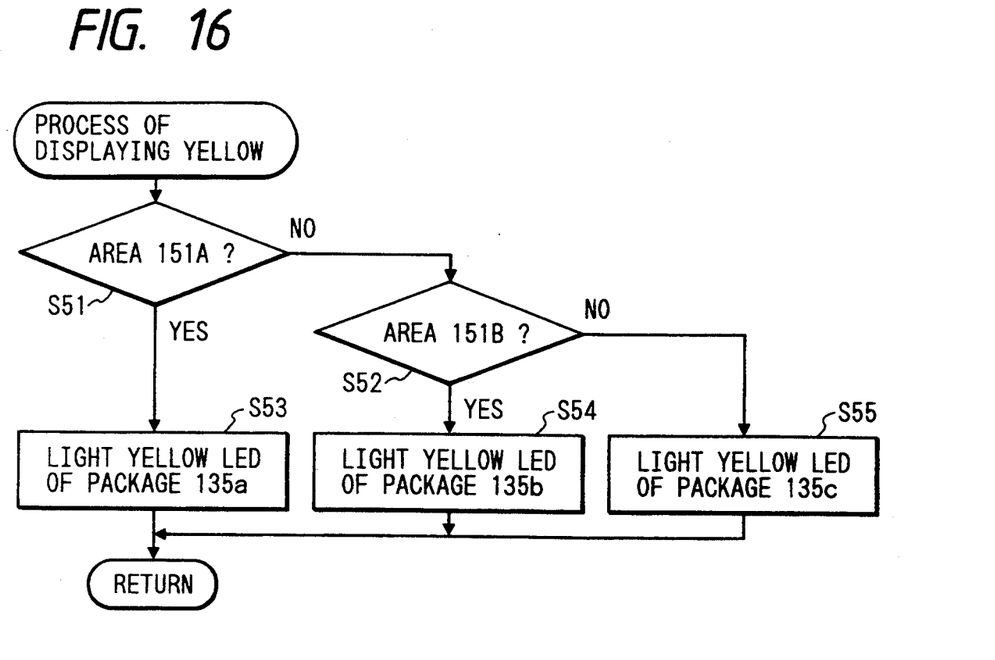
FIG. 16 is a flow chart of a subroutine.

The details of the yellow color display are shown by a subroutine in FIG. 16.

Referring to FIG. 16, steps S51 and S52 identify which of the areas 151A-151C shown in FIG. 10 corresponds to the considered area (corresponding to the defocus amount df1 in this case). If it is the area 151A, the discrimination of the step S51 turns out affirmative and the sequence proceeds to a step S53. If it is the area 151B, the step S52 becomes affirmative and the sequence proceeds to a step S54, and, if it is the area 151C, the step S52 is negated and the sequence proceeds to a step S55.

Steps S53–S55 turn on the yellow LED among the LED's respectively corresponding to the areas 151A–151C, through the light emission control circuit 136. The yellow light from the activated LED illuminates the corresponding one of the display areas 112A–112C, whereby the image of said illuminated display area is rendered observable through the pentagonal prism 115 and the eyepiece lens 116. In this manner said area in the phototaking image field appears to be surrounded by a yellow frame. Thereafter the sequence returns to the main flow shown in FIG. 15.

Figure 17:
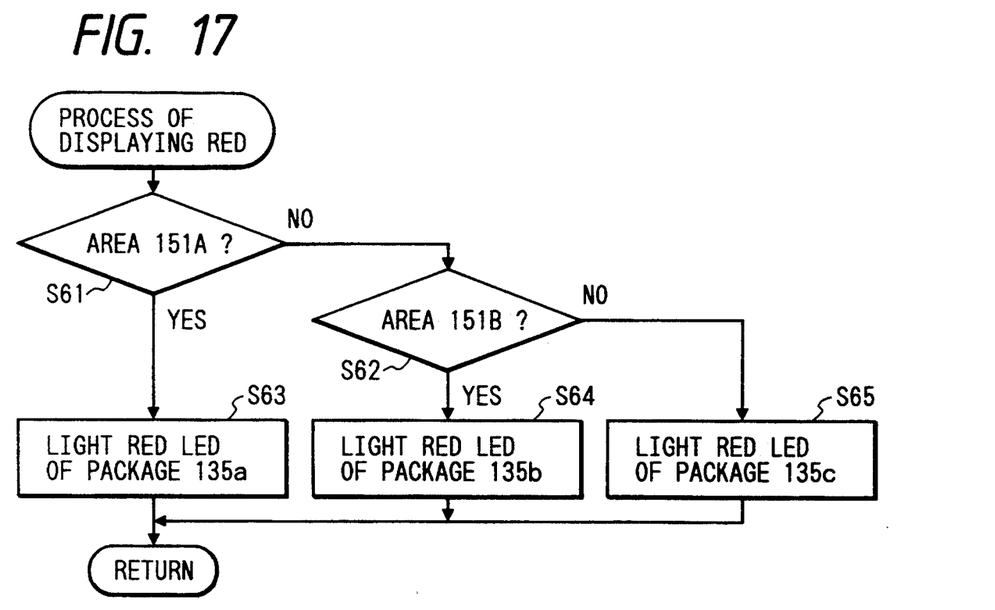
FIG. 17 is a flow chart of another subroutine.

FIG. 17 is a subroutine showing the details of the red color display in the step S11.

Steps S61 and S62 identify the considered area in a similar manner as explained above, and, according to the result of said identification, one of steps S63–S65 activates a red LED corresponding to said identified area, thereby displaying a red frame around said area. Thereafter the sequence returns to the main flow shown in FIG. 15.

Steps S12 to S14 in FIG. 15 execute, for the non-focusing area with the defocus amount df2, a process similar to that executed by the steps S9 to S11 explained above. Subsequently steps S15 to S19 identify said focusing area and indicate said focusing area by activating a blue LED.

The sequence for display is conducted as explained above, and the phototaking operation is conducted by a subsequent full-stroke depression of the shutter release button. According to the sequence explained above, among the plural focus detection areas, the focusing area is indicated by blue, while the non-focusing area or areas within the depth of object field are indicated by yellow, and the non-focusing area or areas outside the depth of object field are indicated by red. Such display of three different areas with respectively different colors allows to recognize the focusing area easily and also to judge whether the objects in the non-focusing areas are within the depth of object field.

Figure 18:
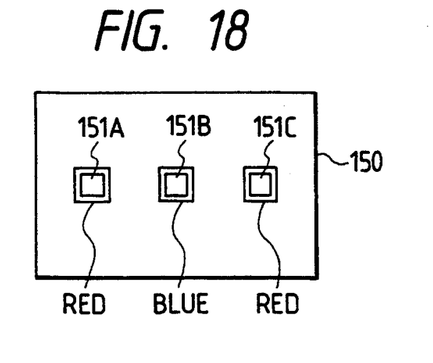
FIG. 18 is a view showing an example of display.
Figure 19:
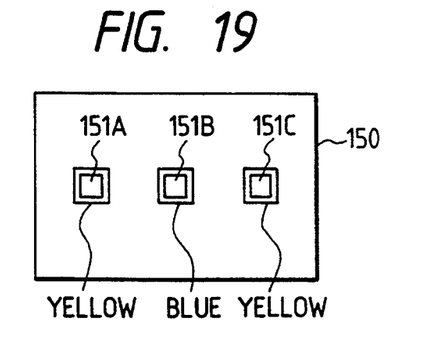
FIG. 19 is a view showing another example of display.

FIG. 18 shows an example in which the central area 151B is the focusing area, and the objects in other two non-focusing areas 151A, 151C are outside the depth of object field. Thus the area 151B is indicated by blue, and other areas 151A and 151C are indicated by red. Thus, if the photographer wishes the objects in these non-focusing areas 151A, 151C to be focused also, he needs only to reduce the diaphragm aperture until the areas 151A, 151C are displayed by yellow as shown in FIG. 19. In this manner the non-focusing areas can also be focused without unnecessary reduction of the diaphragm aperture. In particular, the present embodiment in which these displays are given on the image field within the view finder is convenient since the photographer can make the above-mentioned judgment while looking into the view finder.

Figure 20:
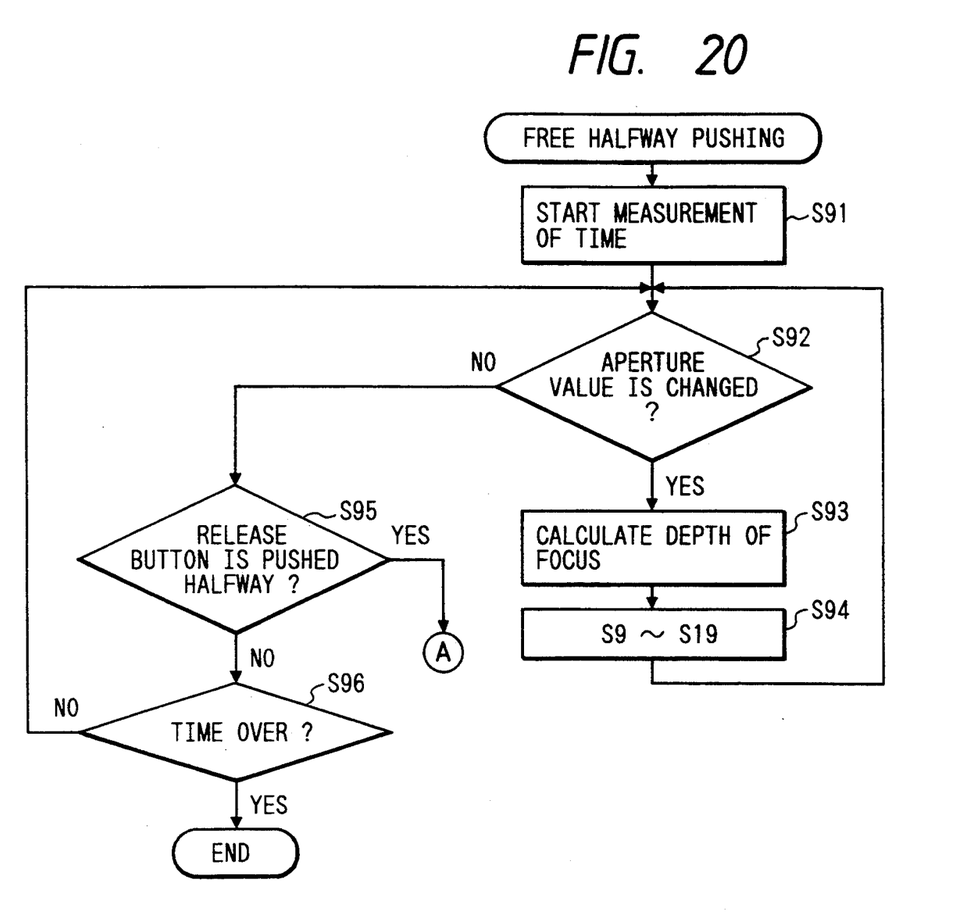
FIG. 20 is a flow chart of another embodiment.

A flow chart shown in FIG. 20 shows an example of the sequence for varying the display state by reducing the diaphragm aperture, applied to a camera equipped with a half-stroke depression timer, and to be executed after the sequence shown in FIGS. 14 to 17. Said half-stroke depression timer is retain the power supply for a predetermined period after the actuation of the shutter release button is released, thereby enabling the display of the areas 112A–112C.

The sequence shown in FIG. 20 is activated when the actuation of the shutter release button is discontinued after the display sequence according to FIGS. 14 to 17. At first a step S91 starts time measurement for the half-stroke depression timer. Then, if a step S92 identifies a change in the aperture value, a step S93 again calculates the depth of focus based on the changed aperture value and the current object distance, then a step S94 executes the process same as that of the steps S9 to S19 in FIG. 15, and the sequence returns to the step S92. If the step S92 is negated, a step S95 discriminates whether the shutter release button has been half-stroke depressed, and, if depressed, the time measurement is terminated and the sequence proceeds to the step S1 in FIG. 14. If said depression has not been conducted, a step S96 discriminates whether the time measurement has been completed, and, if not, the sequence returns to the step S92, but, if completed, the time measurement is terminated whereby this sequence is terminated.

In the above-explained sequence of FIG. 20, the diaphragm aperture is reduced down during the function of the half-stroke depression timer, and the display shown in FIG. 18 varies to a state shown in FIG. 19 when the objects in the non-focusing areas 151A, 151C enter the depth of object field. Thus the photographer can execute the phototaking operation after confirming this change of display, so that the non-focusing areas 151A, 151C can also be focused without excessive reduction of the aperture.

In the foregoing description, the focusing area, the non-focusing area within the depth of object field and that outside the depth of object field are indicated by respectively different colors, but they may also be indicated by continuous and flickering displays of a same color. As an example, the focusing area is indicated by continuous lighting, while the non-focusing area within the depth of object field is indicated by flickering lighting, and that outside the depth of object field is indicated by flickering light of a different duty ratio (or by absence of lighting). Furthermore, they may also be indicated by different shapes of the display, such as circle, triangle and rectangle. Also the structure of the display areas is not limited to that explained above. It may be composed of a light-emitting display such as an electroluminescence device, or a non-light-emitting display such as an electrochromic device. Also the display need not be positioned inside the view finder, but may be provided, in correspondence with the focus detection areas, on a liquid crystal display unit positioned on the surface of the camera body.

Also in the foregoing description, the focus state detection is conducted by so-called TTL phase different detection method, but the method of focus state detection is not limited to such method but can be executed, for example, by an active measurement of object distance such as the triangular distance measurement. In such case said object distance corresponds to the focus detection information. The depth of object field is calculated from the object distance in the focusing area, and thus calculated depth of object field is compared with the object distance in the non-focusing area to discriminate whether the object is within said depth.

What is claimed is:

1. A focus state display device for use in a camera provided with focus detection means for detecting the focus state in each of plural focus detection areas in a phototaking image field and generating focus detection information; and focusing means for selecting one of said plural focus detection areas as the focusing area, and focusing a phototaking lens to an object in said focusing area, based on said focus detection information relating to said focusing area, comprising:

display means for displaying the focus state of each of said plural focus detection areas in at least three different display modes;

calculation means for calculating information relating to the depth of object field, based on object distance information in said focusing area and a selected diaphragm aperture value of the phototaking lens;

discrimination means for judging whether an object present in at least one non-focusing area, other than said focusing area among said plural focus detection areas, is positioned within the depth of object field, by comparing said information relating to the depth of object field and focus detection information in said at least one non-focusing area; and     display control means for controlling said display means in such a manner that said focusing area, at least one non-focusing area of which an object is identified within the depth of object field, and at least one non-focusing area of which an object is identified outside the depth of object field are displayed by respectively different display modes.

2. A focus state display device according to claim 1, wherein said display means provides display in a view finder of the camera.

3. A focus state display device according to claim 1, wherein said three different display modes of the display means are three different colors.

4. A focus state display method for displaying, on a display, information relating to focus states of a plurality of focus detection areas in at least three display modes for each of the focus detection areas, comprising the steps of:

calculating information relating to depth of field, based on object distance information with regard to an in-focused focus detection area among said plurality of focus detection areas, in which a taking lens is in-focused to the object, and a set diaphragm aperture value;

determining whether or not an object present in an out-of-focused focus detection area among said plurality of focus detection areas, in which the taking lens is not in-focused to the object, is positioned within the depth of field, by comparing said information relating to focus states and said information relating to the depth of field; and     displaying an in-focused focus detection area, an out-of-focused focus detection area in which an object is identified within the depth of field, and an out-of-focused focus detection area in which an object is identified outside the depth of field, by respectively different three display modes.

* * * * *